(12) United States Patent
Pemmaraju (10) Patent No.: US 11,770,378 B2
(45) Date of Patent: *Sep. 26, 2023

(54) SYSTEMS AND METHODS FOR CONTROLLING ACCESS TO A BLOCKCHAIN

(71) Applicant: BlockSafe Technologies, Inc., Edison, NJ (US)

(72) Inventor: Ram Pemmaraju, Old Bridge, NJ (US)

(73) Assignee: BlockSafe Technologies, Inc., Edison, NJ (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/466,507

(22) Filed: Sep. 3, 2021

(65) Prior Publication Data

US 2021/0400042 A1 Dec. 23, 2021

Related U.S. Application Data (63) Continuation of application No. 16/291,809, filed on Mar. 4, 2019, now Pat. No. 11,146,555.

(Continued)

(51) Int. Cl.
*H04L 29/06* (2006.01)
*H04L 9/06* (2006.01)
(Continued)

(52) U.S. Cl.
CPC ........ *H04L 63/0884* (2013.01); *H04L 9/0637* (2013.01); *H04L 63/123* (2013.01);
(Continued)

(58) Field of Classification Search
CPC ... H04L 63/0884; H04L 63/20; H04L 63/145; H04L 9/0637; H04L 63/123;
(Continued)

(56) References Cited

U.S. PATENT DOCUMENTS

2009/0013374 A1* 1/2009 Tsai .............. H04L 63/102
726/1
2010/0077444 A1* 3/2010 Forristal ........ H04L 41/0886
726/1
(Continued)

FOREIGN PATENT DOCUMENTS

WO WO-2018/026883 A1 2/2018

OTHER PUBLICATIONS

International Search Report for PCT/US19/20586 dated May 8, 2019 (9 pages).

(Continued)

*Primary Examiner* — Badri Narayanan Champakesan
(74) *Attorney, Agent, or Firm* — Blank Rome LLP (57) ABSTRACT

Systems and methods for controlling access to a blockchain are disclosed. The systems and methods are comprised of a security agent, a controller, an authenticator, a rules engine, and a policy engine. In certain embodiments, the security agent receives a message from an application, parses the message, and transmits the message to the controller if the message comprises one or more predetermined applicable rules or policies. The controller receives the message with its rules and policies, queries the rules engine and the policy engine to apply the rules and policies, and transmits an authentication request to the authenticator. The authenticator then requests an authentication signal from a user and transmits the results to the controller. The controller applies the results and forwards them to the security agent, which may or may not release the message to the blockchain depending the results.

18 Claims, 7 Drawing Sheets

Related U.S. Application Data (60) Provisional application No. 62/650,803, filed on Mar. 30, 2018, provisional application No. 62/637,869, filed on Mar. 2, 2018.

(51) Int. Cl.
*H04L 9/40* (2022.01)
*H04L 9/00* (2022.01)

(52) U.S. Cl.
CPC ........ *H04L 63/145* (2013.01); *H04L 63/1416* (2013.01); *H04L 63/20* (2013.01); *H04L 9/50* (2022.05)

(58) Field of Classification Search
CPC ............. H04L 63/1416; H04L 2209/38; H04L 9/3231; H04L 9/3213; H04L 9/3239; H04L 9/3215
USPC .......................................................... 726/1
See application file for complete search history.

(56) References Cited

U.S. PATENT DOCUMENTS

| | | | |
|---|---|---|---|
| 2011/0314547 A1* | 12/2011 | Yoo | G06F 21/55 726/24 |
| 2012/0036552 A1* | 2/2012 | Dare | H04L 41/0803 726/1 |
| 2013/0042298 A1* | 2/2013 | Plaza Fonseca | H04L 41/12 726/1 |
| 2013/0097666 A1* | 4/2013 | Wu | H04L 63/1425 726/1 |
| 2013/0290234 A1* | 10/2013 | Harris | G06N 5/022 706/46 |
| 2015/0106873 A1* | 4/2015 | Marsh | G06Q 10/0635 726/1 |
| 2015/0143480 A1* | 5/2015 | Wong | H04L 63/08 726/4 |
| 2017/0132626 A1* | 5/2017 | Kennedy | G06Q 20/065 |
| 2017/0187751 A1* | 6/2017 | Andrews | H04L 67/025 |
| 2017/0257358 A1 | 9/2017 | Ebrahimi et al. | |
| 2018/0032273 A1* | 2/2018 | Ateniese | G06F 3/0659 |
| 2018/0039667 A1* | 2/2018 | Pierce | G06F 16/2365 |
| 2018/0040040 A1* | 2/2018 | Barski | G06Q 20/12 |
| 2018/0191754 A1* | 7/2018 | Higbee | G06F 21/554 |
| 2018/0260212 A1* | 9/2018 | Wisnovsky | G06F 16/113 |
| 2019/0294141 A1* | 9/2019 | Krauz | G05B 23/02 |
| 2020/0329022 A1* | 10/2020 | Zhan | G06F 11/3457 |
| 2020/0403992 A1* | 12/2020 | Huffman | H04W 12/06 |

OTHER PUBLICATIONS

Raje et al., "Decentralised firewall for malware detection", IEEE, 2017, pp. 1-5.

* cited by examiner

FIGURE 1

PRIOR ART

FIGURE 2

PRIOR ART

SYSTEMS AND METHODS FOR CONTROLLING ACCESS TO A BLOCKCHAIN

RELATED APPLICATIONS

This application is a continuation of U.S. patent application Ser. No. 16/291,809, filed Mar. 4, 2019, which claims benefit to the following U.S. Provisional Application No. 62/637,869, filed Mar. 2, 2018, and 62/650,803 filed Mar. 30, 2018, the contents of which are incorporated in their entirety.

FIELD OF THE INVENTION

The present invention relates generally to security and, more particularly, to systems and methods to control access to a blockchain.

DESCRIPTION OF THE RELATED ART

A blockchain is a distributed ledger consisting of a list of records. The records are called blocks. These blocks have a specific structure. For example, a block in a bitcoin blockchain has a header, a transaction counter and transactions. The block header is specially designed. It consists of a version number, a time stamp, a hash of the previous block, a hash of the root of the merkle tree of this block's transactions, a difficulty target and a nonce. The difficulty target and the nonce are used in the proof-of-work protocol which makes it possible to achieve consensus among the nodes in the network and rewards the node which comes up with the nonce first ("the miner"). It also prevents forged-identity Sybil attacks and solves the double-spending problem. The cryptographic links make it easy to read the database and to verify its accuracy, but make it extremely difficult for an attacker to alter or change the order of records. Because of these properties, a blockchain is a machine-readable unalterable historical record.

The first work on a cryptographically secured chain of blocks was described in 1991. In 1992, Merkle trees were incorporated into the blockchain to enable multiple records in the block. In 1998, Wei-Dai was the first one to conceptualize "b-money". His ideas and the subsequent work by Hal Finney and Adam Back laid the groundwork for Satoshi Nakomoto's revolutionary Bitcoin crypto currency in 2009. Bitcoin's success led to a number of alternative applications (coins) either by building a new blockchain or building on top of Bitcoin's blockchain using a scripting language or building a meta-protocol. The limits of this strategy soon became apparent. Building a new blockchain is not easy and requires significant development. It is easier to build on top of Bitcoin's blockchain using its scripting language. But since it is not Turing complete and is not syntax-friendly, it limits its usefulness. However, a number of alt-coins use this approach.

There are two types of blockchains—public and private. In a public blockchain, anyone can become a miner. They have complete access to the distributed ledger, can initiate transactions and create smart contracts. The Bitcoin blockchain is the largest public blockchain. The main Ethereum network is also a public blockchain. A private blockchain is a permissioned network. Permission is required to read the information on the blockchain and conduct transactions. Nodes that perform the mining are defined by the entity that manages the private blockchain. Private blockchains are run either by consortiums or by a single entity, such as a corporation.

In 2014, Ethereum, funded by a token crowd sale, also known as an Initial Coin Offering (ICO), took this a step further. Ethereum is a blockchain complete with a virtual machine called Ethereum Virtual Machine (EVM). The token of the Ethereum blockchain is called ether (ETH). It is traded on cryptocurrency exchanges and also used to pay for transaction fees (called "gas") on the Ethereum network. The Ethereum platform runs smart contracts. A Smart Contract is an autonomous program that executes itself when a specific condition, for example the terms of a contract, are met. Because smart contracts run on the blockchain, they run exactly as programmed and are immutable and have zero downtime. As a result, smart contracts are used for a variety of applications, including those managing financial transactions, Decentralized Autonomous Organizations (DAOs), identity and reputation systems, digital assets (currencies), smart property, etc.

Figure 1:
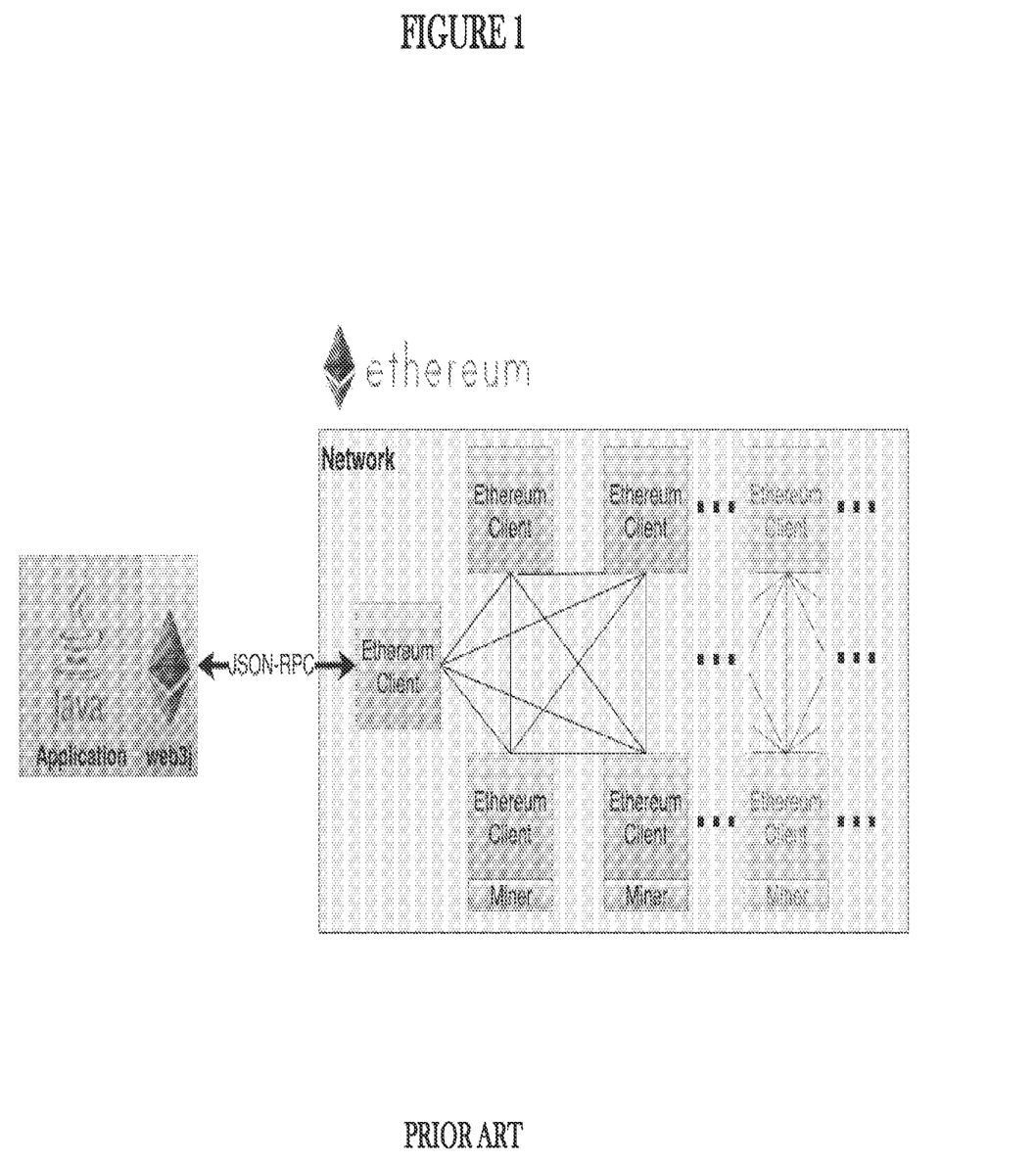
FIG. 1 is a diagram depicting the components of the Ethereum network.

Consider a private blockchain setup with Ethereum. A network of Ethereum nodes, (called Ethereum Clients) constitute the private network, which is shown in FIG. 1. The network is identified by a specific network id. Users interact with an Ethereum client via a dApp. The dApp could be a wallet, or custom software (web app, java app, etc. that incorporates web3j) that talks to the Ethereum client via JSON-RPC (Remote Procedure Calls that invoke Ethereum APIs on the Ethereum client). The APIs allow the user to query the blockchain, initiate transactions and create smart contracts. What a user is allowed to do depends on the permissions granted to a user. For example, only some of the users should be allowed to access the admin API, some of the users (developers) should be able to create smart contracts, etc.

Figure 2:
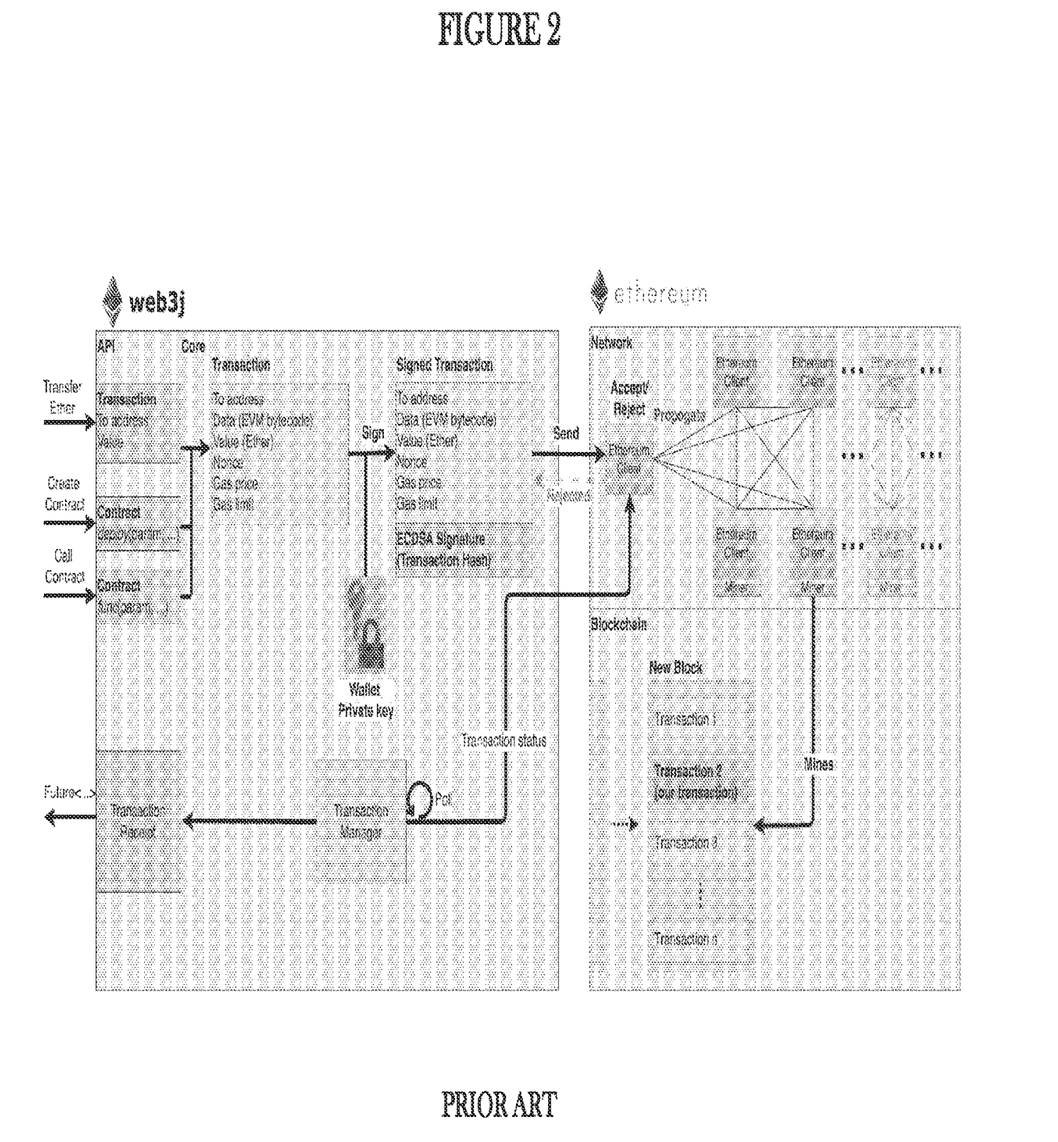
FIG. 2 is a diagram depicting how the Ethereum client receives a transaction via JSON-RPC to process blockchain messages.

There are JSON-RPC interfaces to all the popular blockchains—Bitcoin, Ethereum, Eris and Quorum (built on top of Ethereum), Ripple and Hyperledger (implementations—Fabric, Sawtooth and Corda). Transactions are initiated by a user (Externally Owned Account). The transaction is signed by the user's private key and relayed to the Ethereum client via JSON-RPC. At the client side, the transaction is validated, and then relayed to the other clients. At some point in time, the transaction is mined into a block. A diagram of that system is shown in FIG. 2.

A smart contract is implemented as a set of functions, each one defined by a sequence of bytecode instructions. The contracts can transfer ether to/from users and to other contracts. Users send transactions to the blockchain network in order to create new contracts, invoke functions, or transfer ether to other contracts or users. All the transactions are recorded on the blockchain. Since smart contracts have economic value associated with them, it is crucial to guarantee that their execution is performed correctly. Otherwise, an attacker can tamper with the execution and send ether to the wrong party.

Several security vulnerabilities in smart contracts have been discovered. These vulnerabilities have been exploited by attacks on Ethereum contracts, causing significant loss of money. Some of the vulnerabilities are due to Solidity, the language in which most Ethereum smart contracts are written. Others are calls to untrusted contracts, reentrancy, exception handling, etc. The problem is that due to its distributed nature, the source code of a smart contract is publicly visible. Thus attackers have access to modify smart contracts if they can find vulnerabilities in the code.

As a consequence, there is a need in the art for systems and methods that are more effective in protecting blockchain networks and ensuring that only authenticated individuals are able to transmit transactions and/or access wallets in the blockchain network.

BRIEF SUMMARY OF THE INVENTION

It is therefore an object of the invention to disclose systems and methods for controlling access to a blockchain. The systems and methods are comprised of a security agent, a controller, an authenticator, a rules engine, and a policy engine. In certain embodiments, the security agent receives a message from an application, parses the message, and transmits the message to the controller if the message comprises one or more predetermined applicable rules or policies. The controller receives the message with its rules and policies, queries the rules engine and the policy engine to apply the rules and policies, and transmits an authentication request to the authenticator. The authenticator then requests an authentication signal from a user and transmits the results to the controller. The controller applies the results and forwards them to the security agent, which may or may not release the message to the blockchain depending the results.

It is another object of the invention to disclose systems and methods for controlling access to a blockchain by using a content scanner to identify malware associated with the message.

It is yet another object a the invention to disclose systems and methods for controlling access to a blockchain by using an enterprise interface to interact with third-party software.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Figure 3:
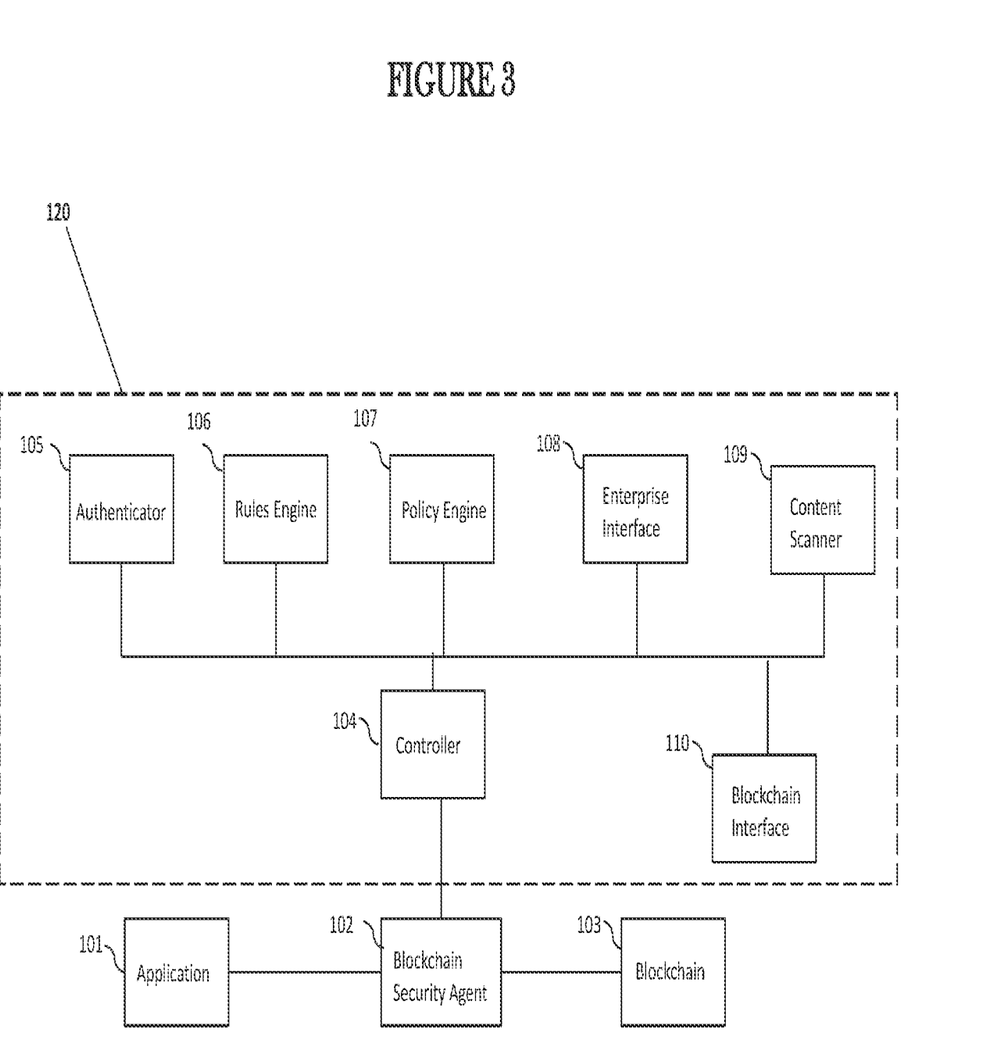
FIG. 3 is a diagram depicting the software components of the invention in accordance with an exemplary embodiment of the invention.

In certain embodiments, the present invention controls access to the blockchain. FIG. 3 shows an exemplary schematic of the major components of the present invention. The invention is preferably comprised of the following components: a Blockchain Security Agent 102 that is located between a dApp and a JSON-RPC client such as the Ethereum client, and (2) a Blockchain Security Service 120.

The Blockchain Security Agent 102 performs a number of functions—

Blockchain Firewall—It acts as a blockchain firewall, shielding the clients on the blockchain network. It examines the traffic flowing between the application and the blockchain network and allows messages that meet the policies of the organization.

Authentication—It parses a JSON-RPC message and extracts the user's account identifier and sends it to the Blockchain Security Service to authenticate the user. If the user successfully authenticates itself, the JSON-RPC message is passed to the blockchain, or else it is blocked.

Policy Enforcement—It acts as a Policy Enforcement Point and allows for granular access. It implements the access policies of the consortium or the enterprise and enforces users roles and capabilities. For example, users initiate transactions that require sending messages to a smart contract on the blockchain. Users are first authenticated then roles are checked against policies. With permission granted, messages are forwarded to the blockchain, else they're blocked.

Figure 4:
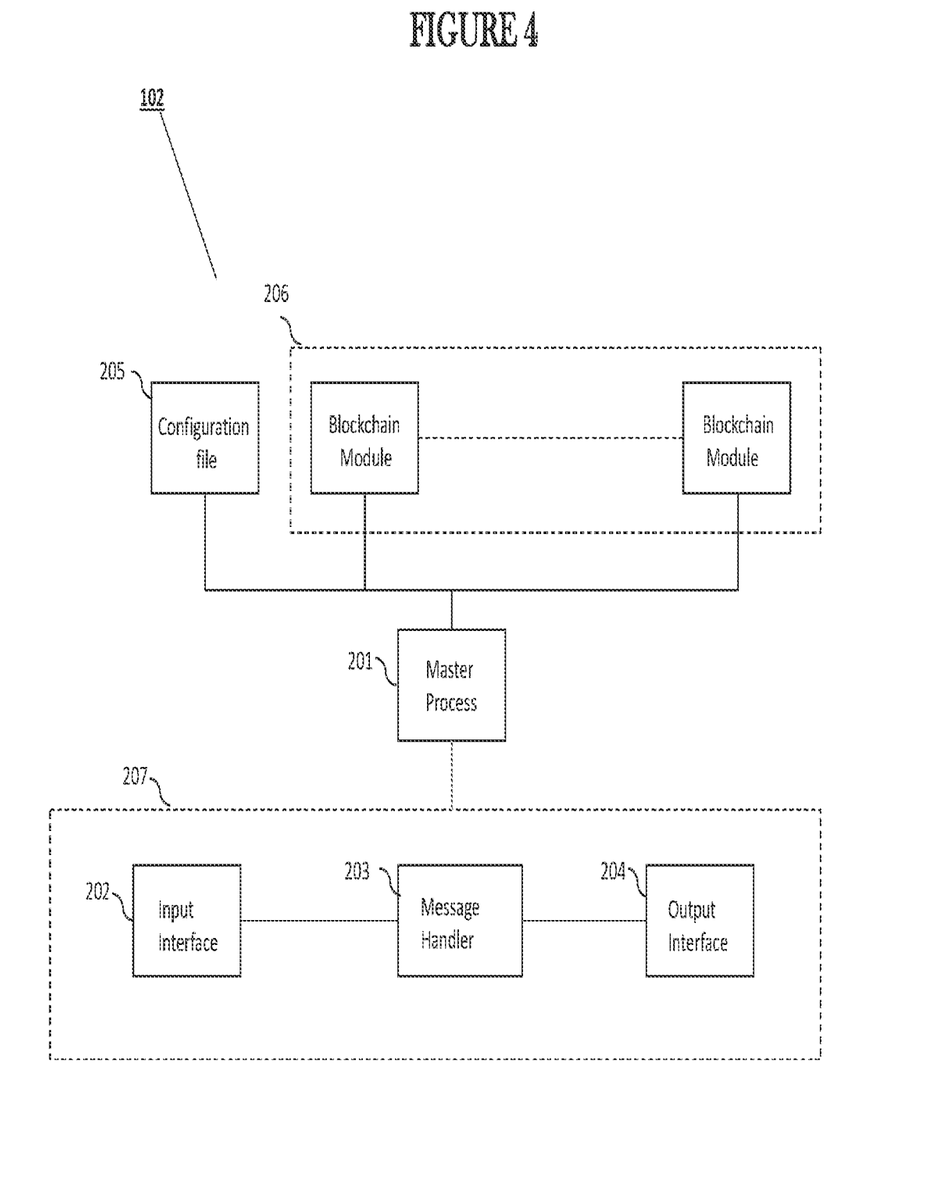
FIG. 4 is a diagram of the software components of the Blockchain Security Agent in accordance with an exemplary embodiment of the invention.

The Blockchain Security Service 120, shown in FIG. 4, has the following capabilities:

Authentication it supports multiple methods; including—Out-of-Band Phone—#, PIN, OTP, and/or Voice, OTP Delivery to Phone via SMS, Voice, Email, and/or Push, Out-of-Band Push—Accept/Deny, PIN, and/or Fingerprint, Hard Tokens—Key Fob, USB Key, and/or Wallet Cards, Mobile Tokens—iOS and Android. Desktop Tokens—Windows, OS X & MacOS, and/or Linux.

Policy Engine—The Policy Server stores the user access policies for the blockchain. It defines user roles and maps the roles to capabilities.

Rules Engine—The Rules Engine stores rules that will be used by the Agent software to enforce access. For example, a rule might be to invoke two-factor authentication if the transaction is over a certain amount.

Content Scanner—The Content Scanner scans the data field of the message to ensure that the content is not malicious.

Enterprise Interface—The Enterprise interface passes the blockchain messages to enterprise software.

Blockchain Interface—The Blockchain Interface passes the blockchain messages to other blockchains either of the same type or other types (after re-formatting the messages).

FIG. 3 depicts major software components of the invention in accordance with an exemplary embodiment of the invention. The invention is comprised of the following modules: the Blockchain Security Agent 102, the Controller 104, the Authenticator 105, the Rules Engine 106, the Policy Engine 107, the Enterprise Interface 108 and the Content Scanner 109. It will be apparent to one of ordinary skill that the functionalities of one or more of the modules may be split or merged across different hardware components, which are described in greater detail in connection with FIG. 7.

FIG. 3 also describes an exemplary software pathway through which the invention operates. The pathway is initiated when the Blockchain Security Agent 102 intercepts messages to the Blockchain 103 and either passes them on to the Blockchain 103 or blocks them. Messages may be comprised of such exemplary data as a transaction request or a wallet inquiry. The Blockchain Security Agent 102 sends messages of interest to the Controller 104 for further processing.

The Controller 104 receives messages from the Blockchain Security Agent 102 and determines whether the messages should be forwarded to the blockchain or blocked. Determinations apply the Rules Engine 106, the Policy Engine 107, the Enterprise Interface 108, and/or the Content Scanner 109, as further explained below.

The Authenticator 105 authenticates the sender of the message. It supports multiple methods including: Out-of-Band Phone—#, PIN, OTP, and/or Voice, OTP Delivery to Phone via SMS, Voice, Email, and/or Push, Out-of-Band Push—Accept/Deny, PIN, and/or biometrics, Hard Tokens—Key Fob, USB Key, and/or Wallet Cards, Mobile Tokens—iOS and Android, and Desktop Tokens—Windows, OS X & MacOS, and/or Linux. The Authenticator 105 may also have a provisioning interface and an interface for the administrator to manage it. Through this provisioning and administration interface, an administrator or other authorized individual may set rules and policies, while also receiving reporting data about which authentications have been performed and why they were performed.

The Rules Engine 106 stores rules used pertaining to access. For example, a rule may be that any transaction that uploads a smart contract needs to be authenticated. An administrative interface will enable the Rules Engine 106 to be managed. In general, the administrative interface may be used to set criteria for authenticating the sender of a message. Authentication may be triggered by a message identified as a transaction, data appended to the transaction identifying it as requiring authentication, or data appended to the transaction requesting a particular form of authentication. Other rules stored at the Rules Engine 106 may be those requiring certain transactions to be logged, which transaction types should be sent on to the Enterprise Interface 108, and which transactions should be sent on to the Blockchain Interface 110. Other rules may be applied, which will be apparent to those of ordinary skill.

The Policy Engine 107 stores user access policies for the blockchain. It defines user roles and maps the roles to capabilities. An administrative interface will enable the Policy Engine 107 to be managed. The Policy Engine 107 enables an entity to define one or more policies for authentication. For example, the Policy Engine 107 may include such policies as whether a certain user is allowed to use the blockchain, whether a user is allowed to submit a transaction to the blockchain, whether a user is allowed to create a smart contract for submission to the blockchain, whether a user is allowed to read data from the blockchain, what data a user is allowed to read from the blockchain, and whether a user is allowed to invoke administrative APIs and access the administrative interface of the system. Other policies may be applied, which will be apparent to those of ordinary skill in the art.

The Enterprise Interface 108 interfaces to enterprise software such as ERP (Enterprise ResourcePlanning), CRM (Customer Relationship Management), and others known in the art. The Enterprise Interface 108 is comprised of modules for interacting with third-party software. It may also expose a common API (Application Programming Interface) that can be used to develop an interface to third-party software. The Enterprise Interface may reformat the blockchain message for a particular enterprise application. For example Salesforce.com uses a REST/SOAPI API to connect to their system. The Enterprise Interface may reformat the blockchain message in a format suitable to access the REST/SOAP API. Prior to reformatting, the message may have to be decoded (as some blockchain messages are encoded). Integration with Enterprise Software is useful for many reasons including, but not limited to, logging the blockchain transaction details and enabling other workflow tasks.

The Content Scanner 109 scans a received message for malicious content. The data portion of a transaction may carry unknown data that may be dangerous to a network, including malware or other malicious programs. The Content Scanner 109 may be comprised of one or more databases that store data related to known malware and viral threats. The Content Scanner 109 applies the databases to determine whether the contents of a received message include malware or viruses. It may perform a heuristic analysis to determine whether message content may be malicious. The Content Scanner 109 may also check the message data to determine the message type, for example, if the proposed transaction is a smart contract, and whether that smart contract may be a malicious attempt to corrupt the blockchain.

The Blockchain Interface 110 interfaces to other blockchains. The interface is comprised of modules for linking to one or more blockchains. It may also expose a common JSON-RPC that can be used to develop an interface to any additional blockchains. Every blockchain has a specific message format, or if it is the same blockchain type, the blockchains are segregated by means of different network IDs and access parameters. The Blockchain Interface is configured to route the message to another blockchain (after decoding, if the message is encoded) by reformatting the message and forwarding it to the other blockchain network.

FIG. 3 also shows the methodology to process blockchain messages. The Blockchain Security Agent 102 receives messages intended for the Blockchain 103 from the Application 101. These messages are typically encoded as JSON-RPC messages or REST API messages which specify commands to be executed by the blockchain. An example of a JSON-RPC message is given below—

```
{"jsonrpc":"2.0","method":"eth_sendTransaction","params":[{see below}],"id":}
params: [{
"from": "0xb60e8dd61c5d32be8058bb8eb970870f07233155",
"to": "0xd46e8dd67c5d32be8058bb8eb970870f07244567",
"gas": "0x76c0", // 30400
"gasPrice": "0x9184e72a000", // 10000000000000
"value": "0x9184e72a", //2441406250
"data":
"0xd46e8dd67c5d32be8d46e8dd67c5d32be8058bb8eb970870f072445675058bb8eb970870f072
445675"
}]
```

The Blockchain 103 executes the method based on the parameters sent to the method. The data field of the method may contain an encoded smart contract. The Blockchain Security Agent 102 parses the messages to determine methods of interest. If there is a method of interest, the message is sent to the Controller 104 for further processing, as explained above. The result from the Controller 104 determines whether the message is passed on to the Blockchain 103 or not.

The Controller 104, parses the messages sent by the Blockchain Security Agent 102. The Controller 104 identifies the sender of the message and checks with the Policy Engine 107 to determine if the sender and message meet the policies of the organization. The Controller 104 determines the role of the sender (admin, user, guest, etc.) and checks the allowable methods for that user. Examples include whether the user is permitted to perform a transaction, add a smart contract, or query the blockchain. The Controller 104 then checks with the Rules Engine 106 to determine any rules that affect the handling of the message. Examples include whether user authentication is required and whether the message should be sent to other enterprise software. If authentication is required, the Controller 104 passes relevant data to the Authenticator 105, awaits the result, and passes it to the Blockchain Security Agent 102. If the message has to be relayed to other software, it is passed to the Enterprise Interface 108. Prior to sending the message to the Authenticator 105, the Controller 104 also may check the message with the Content Scanner 109 to determine if the content is malicious, as explained above.

Upon completion of the above steps, the Authenticator 105 initiates contact with the sender and request that the sender authenticate the transaction. The result of the authentication is passed back to the Controller 104 which will either forward the message to the Blockchain 103 or not.

FIG. 4 depicts the exemplary components of the Blockchain Security Agent 102: the Master Process 201, the Child Process 207, the Configuration File 205, and the Blockchain Module(s) 206. The Child Process 207 is comprised of the Input Interface 202, the Message Handler 203, and the Output Interface 204. Preferably, there are multiple Child Processes 207 for higher throughput. The Master Process 201 controls the operation of the Blockchain Security Agent 102 and communicates with the other components. The Child Process 207 handles incoming messages destined for the Blockchain 103.

The Configuration File 205 stores the configuration for the Blockchain Security Agent 102 and includes information such as the number of processor threads, Blockchain Module(s) 206 to be loaded, the address of the Controller 104, IP Address and TCP ports on which the Blockchain Security Agent 102 must run, the http protocols that must be handled, the data required to handle SSL (such as the location of the public/private keys, cipher suites etc.), directives to prevent http flooding (to prevent DDoS attacks) and directives to handle load balancing. The Configuration File 205 can be static or dynamically loaded from a database upon startup. It can be configured either via a file editor or via an administrative interface.

The Blockchain Module(s) 206 contain information specific to a particular blockchain. This data may include the type and identifier of the blockchain, the TCP/IP address(es) of the Blockchain 103, the network id, the JSON-RPC version, the message format, methods that are supported, signature formats, ciphers supported and consensus algorithm. Other data may also be present that will be readily apparent to one of ordinary skill in the art.

Figure 5:
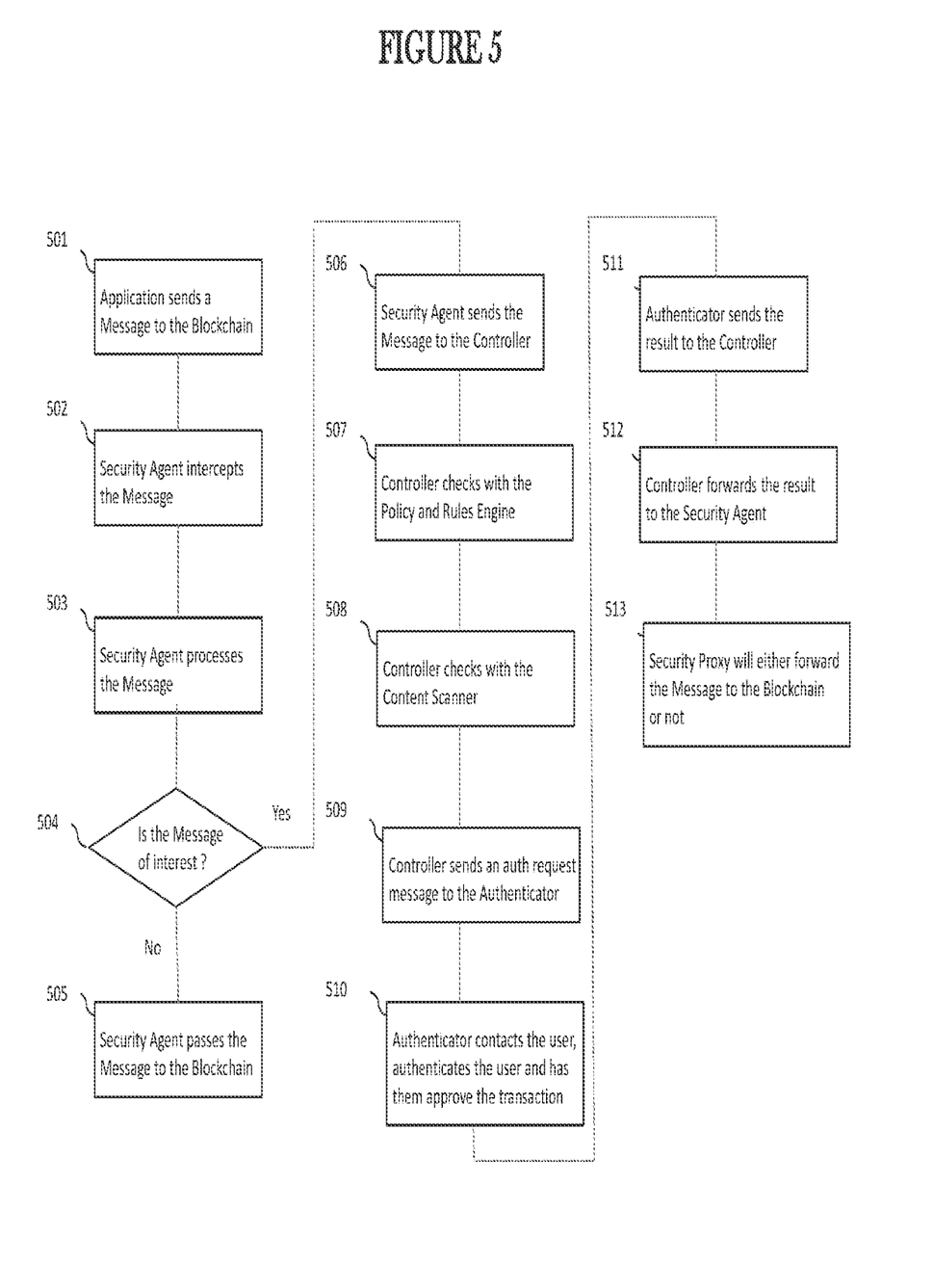
FIG. 5 is a flow chart of a general software pathway followed by an exemplary embodiment of the invention.

FIG. 5 is an exemplary flow diagram showing how a message to a blockchain is managed by the present invention. At step 501, the application sends a message to the blockchain. Rather than reaching the blockchain, the Security Agent 102 intercepts this message at step 502. At step 503, the Security Agent 102 parses the message as explained above, and at step 504, determines whether or not it is of interest. At this step, the rules and policies associated with the message are identified. If rules and policies are not present or are not of interest, the message is forwarded to the Blockchain at step 505. Alternatively, the Security Agent 102 transmits the message to the Controller 104 at step 506.

At step 507, the Controller 104 checks the Rules Engine 106 and the Policy Engine 107 to determine how the message should be authenticated as well as whether the user is permitted to perform the actions attempted by the message. Then, at step 508, the Controller 104 uses the Content Scanner 109 to determine whether the message is comprised of malware or viral threats, as well as a heuristic analysis to determine whether message content may be malicious. As explained above, the Content Scanner 109 may also check the message data to determine the message type, for example, if the proposed transaction is a smart contract, and whether that smart contract may be a malicious attempt to corrupt the blockchain.

At step 509, following the application of the Rules Engine 106, the Policy Engine 107, and the Content Scanner 109, the Controller 104 transmits an authentication request signal to the Authenticator 105. At step 510, the Authenticator 105 contacts the user who sent the message and performs the authentication specified by the Rules Engine 106 and/or Policy Engine 107. Authentication types may include Out-of-Band Phone—#, PIN, OTP, and/or Voice, OTP Delivery to Phone via SMS, Voice, Email, and/or Push, Out-of-Band Push—Accept/Deny, PIN, and/or Fingerprint, Hard Tokens—Key Fob, USB Key, and/or Wallet Cards, and/or Mobile Tokens—iOS and Android, Desktop Tokens—Windows, OS X & MacOS, and/or Linux. The user may approve or deny the transaction request.

At step 511, the Authenticator 105 receives the user's approval or denial of the transaction as a data signal and forwards the result corresponding to the data signal to the Controller 104. At step 512, the Controller forwards that result to the Security Agent 102. Based on an approval, at step 513, the Security Agent 102 forwards the message which is comprised of the transaction to the blockchain for verification. Alternately, if the result of the authentication is a denial, the Security Agent 102 may perform no additional action or it may send an error message to the user.

Figure 6:
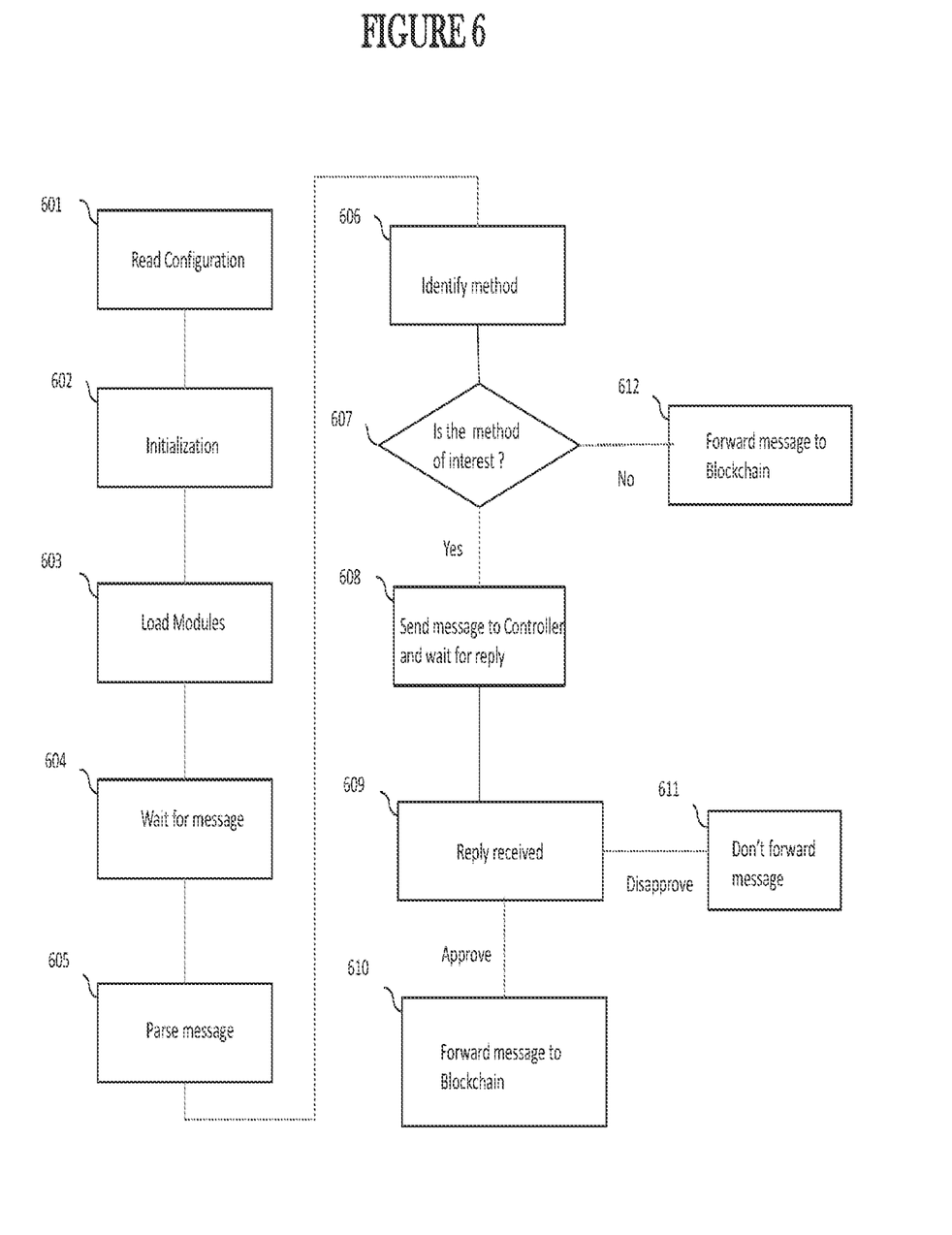
FIG. 6 is a flow chart of the software pathway that focuses on the Blockchain Security Agent, in accordance with an exemplary embodiment of the invention.

FIG. 6 is a flow diagram showing another exemplary software process in accordance with the present invention and in relation to FIG. 4. The pathway commences at step 601, where the Configuration File 205 is read. At step 602, the information in the file is used to initialize the system variables as well as to load the appropriate Blockchain Module 206, which is shown at step 603. At step 604, the Input Interface 202 waits for a message from the Application 101. When the message arrives, at step 605, the message is passed to the Message Handler 203, which parses the message.

At step 606, upon parsing the message, the rules and policies associated with the message are identified. At step 607, if rules and policies not are present or are not of interest, the message is forwarded to the Blockchain 103, shown as step 612. Alternatively, if the rules and policies trigger authentication, the message is forwarded to the Controller 104 at step 608. Upon completion of the processes discussed in FIGS. 3 and 5, the Controller 104 returns a reply at step 609. When a reply is received from the Controller 104, it is examined. If the authentication is successful, the message is forwarded to the Blockchain 103 for standard verification at step 610. If the authentication is not successful, the message is discarded at step 611.

Figure 7:
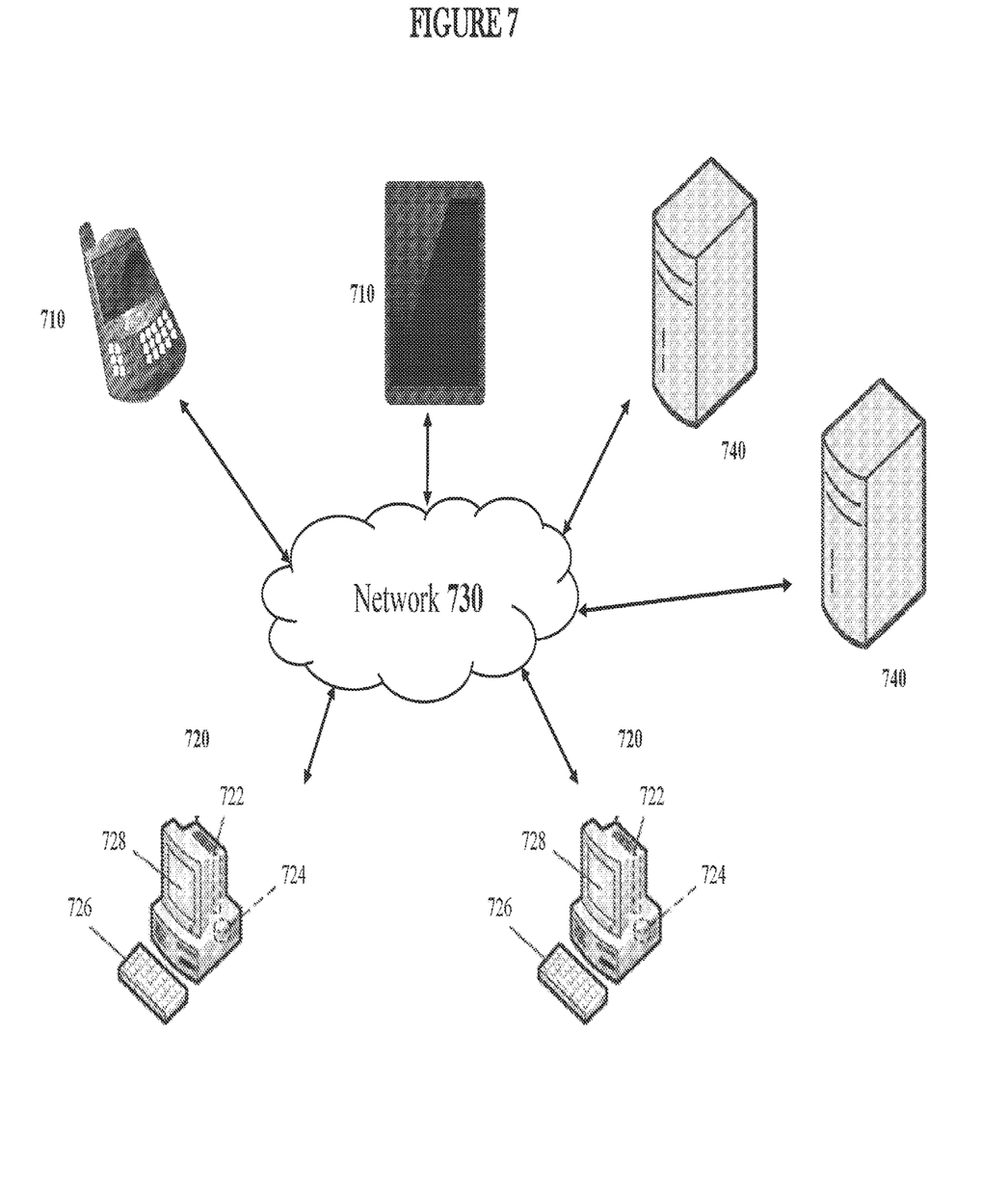
FIG. 7 is a diagram of the hardware used in accordance with an exemplary embodiment of the invention.

FIG. 7 is an exemplary embodiment of the hardware of the blockchain access control system. In the exemplary system 700, one or more peripheral devices 710 are connected to one or more computers 720 through a network 730. Examples of peripheral devices 710 include clocks, smartphones, tablets, wearable devices such as smartwatches, and any other networked devices that are known in the art. The network 730 may be a wide-area network, like the Internet, or a local area network, like an intranet. Due to the network 730, the physical location of the peripheral devices 710 and the computers 720 has no effect on the functionality of the hardware and software of the invention. Unless otherwise specified, it is contemplated that the peripheral devices 710 and the computers 720 may be in the same or in different physical locations. Communication between the hardware of the system may be accomplished in numerous known ways, for example using network connectivity components such as a modem or Ethernet adapter. The peripheral devices 710 and the computers 720 will both include or be attached to communication equipment. Communications are contemplated as occurring through industry-standard protocols such as HTTP and/or security-enhanced protocols like HTTPS.

Each computer 720 is comprised of a central processing unit 722, a storage medium 724, a user-input device 726, and a display 728. Examples of computers that may be used are: commercially available personal computers, open source computing devices (e.g. Raspberry Pi), commercially available servers, and commercially available portable devices (e.g. smartphones, smartwatches, tablets). In one embodiment, each of the peripheral devices 710 and each of the computers 720 of the system may have the software related to the system installed on it. In such an embodiment, data may be stored locally on the networked computers 720 or alternately, on one or more remote servers 740 that are accessible to any of the networked computers 720 through a network 730. Users may interact with any of the remote servers 740, the computers 720, the peripheral devices 710, or any combination thereof. The remote servers 740 are configured to run the software of the present invention. In certain embodiments, the software, and modules thereof, of the present invention may run as one or more applications or processes on the remote servers 740, the computers 720, the peripheral devices 710, or any combination thereof.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A non-transitory computer readable medium comprising computer-readable instructions for controlling access to a blockchain comprising:
   a security agent;
   a controller; and
   a blockchain interface;
   wherein the security agent transmits a message to the controller;
   wherein the controller transmits the message to the blockchain interface;
   wherein the blockchain interface receives the message and reformats the message to comply with blockchain policies corresponding to a blockchain identity associated with the message, wherein prior to reformatting, the message is decoded; and
   wherein the controller comprises a content scanner which performs a heuristic analysis of the message for malware content using one or more databases that store data related to known malware and virus threats; and
   wherein the blockchain interface transmits the reformatted message to the blockchain corresponding to the blockchain identity.

2. The non-transitory computer readable medium of claim 1, further comprising an authenticator that authenticates a sender of the message.

3. The non-transitory computer readable medium of claim 2, wherein the authenticator transmits a data signal comprising a result of the authentication to the controller.

4. The non-transitory computer readable medium of claim 2, wherein the authenticator comprises a provisioning interface to configure authentication policies.

5. The non-transitory computer readable medium of claim 1, further comprising an enterprise interface for interaction with one or more third-party applications.

6. The non-transitory computer readable medium of claim 5, wherein enterprise interface is an application programming interface.

7. The non-transitory computer readable medium of claim 1, wherein the security agent uses a configuration file to detect messages of interest.

8. A computer-implemented method for controlling access to a blockchain comprising:
   receiving, at a security agent, a message and transmitting the message to a controller;
   transmitting the message from the controller to a blockchain interface;
   analyzing the message at the blockchain interface to identify a blockchain identity associated with the message;
   reformatting the message, at the blockchain interface, to comply with blockchain policies corresponding to the blockchain identity associated with the message, wherein prior to reformatting, the message is decoded; and
   wherein the controller comprises a content scanner which performs a heuristic analysis of the message for malware content using one or more databases that store data related to known malware and virus threats; and
   transmitting the reformatted message to the blockchain corresponding to the blockchain identity associated with the message.

9. The computer-implemented method of claim 8, further comprising authenticating a sender of the message at an authenticator.

10. The computer-implemented method of claim 9, further comprising transmitting a data signal comprising a result of the authentication to the controller.

11. The computer-implemented method of claim 9, wherein the authenticator comprises a provisioning interface to configure authentication policies.

12. The computer-implemented method of claim 8, further comprising interacting with one or more third-party applications at an enterprise interface.

13. The computer-implemented method of claim 12, wherein enterprise interface is an application programming interface.

14. The computer-implemented method of claim 8, wherein the security agent uses a configuration file to detect messages of interest.

15. A computer-implemented method of controlling access to a blockchain comprising:
   receiving a message at a security agent, wherein the message has a blockchain identity associated with a blockchain;
   wherein the blockchain interface receives the message and reformats the message to comply with blockchain policies corresponding to a blockchain identity associated with the message, wherein prior to reformatting, the message is decoded; and
   wherein the controller comprises a content scanner which performs a heuristic analysis of the message for malware content using one or more databases that store data related to known malware and virus threats; and
   transmitting the message from the security agent to a controller;
   using a content scanner, at the controller, to identify malware associated with the message, wherein in response to determination that the content scanner identifies malware associated with the message, the controller discards the message; and
   transmitting the message from the controller to the blockchain corresponding to the blockchain identity associated with the message.

16. The computer-implemented method of claim 15, wherein the message is reformatted to comply with blockchain user access policies and rules associated with the blockchain corresponding to the blockchain identity associated with the message.

17. The computer-implemented method of claim 15, further comprising authenticating a sender of the message at an authenticator.

18. The computer-implemented method of claim 15, further comprising interacting with one or more third-party applications at an enterprise interface.

* * * * *